No. 754,258. Patented March 8, 1904.

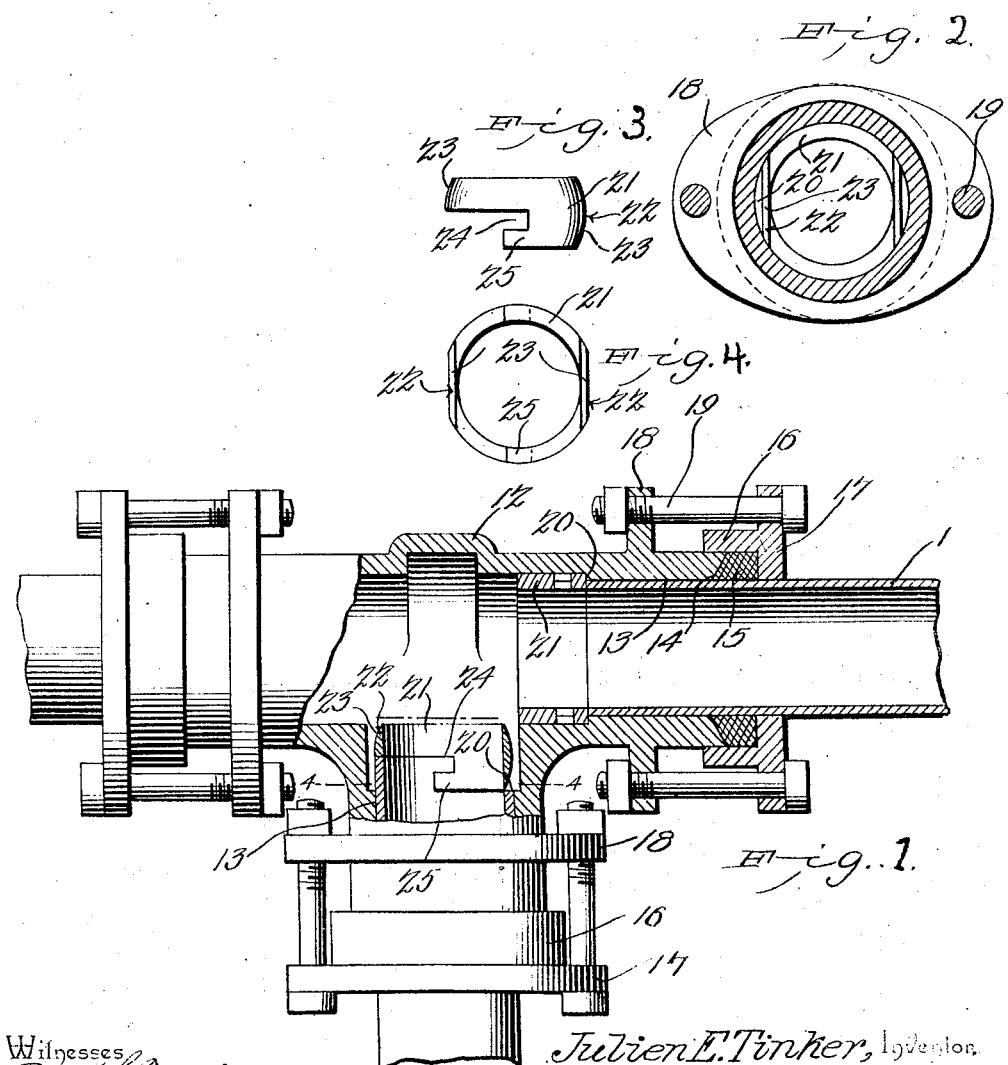

UNITED STATES PATENT OFFICE.

JULIEN EUGENE TINKER, OF BRADFORD, PENNSYLVANIA, ASSIGNOR OF ONE-HALF TO PULASKI B. BROUGHTON, OF BRADFORD, PENNSYLVANIA.

PIPE-COUPLING.

SPECIFICATION forming part of Letters Patent No. 754,258, dated March 8, 1904.

Application filed November 25, 1902. Serial No. 132,752. (No model.)

*To all whom it may concern:*

Be it known that I, JULIEN EUGENE TINKER, a citizen of the United States, residing at Bradford, in the county of McKean and State of Pennsylvania, have invented a new and useful Pipe-Coupling, of which the following is a specification.

This invention relates to joints or couplings for pipes and tubing; and it has for its object to provide a lock-joint or coupling whereby the ends of the pipes or tubes may be united quickly and conveniently with the coupling member in such a manner as to avoid the possibility of longitudinal displacement, and hence with the ability to resist high pressure.

My invention consists in the improved construction of the interlocking pipe ends and in the combination therewith of locking or coupling members, all constructed and arranged as will be hereinafter fully described, and particularly pointed out in the claim.

In the accompanying drawings, Figure 1 is a sectional view illustrating my invention applied to a T-coupling. Fig. 2 is a sectional view taken on the line 2 2 in Fig. 1. Fig. 3 is a side view of a coupling-ring used in connection with the device. Fig. 4 is an end view of the said coupling.

Corresponding parts in the several figures are indicated by similar numerals of reference.

The pipes or tubes 1 that are to be connected by means of my improved coupling device are prepared for being thus connected by providing the ends thereof with undercut portions 2, the ends of the pipes being trimmed to form L-shaped lugs or rather lugs 3, which are L-shaped when seen from the edge of the pipe.

In Fig. 1 a T coupling has been shown. This is prepared for the reception of the pipe ends by providing its arms or branches with openings 15 of an interior diameter exactly corresponding with the exterior diameter of the pipes, and with beveled ends 14 to engage beveled rubber gaskets 15, seated within annular flanges 16 of coupling-plates 17. The branches of the coupling are also provided with perforated lugs 18 for the passage of bolts 19, whereby they are connected with said coupling-plates. The inner ends of the openings 13 are enlarged to form shoulders 20. These shoulders serve as seats for the coupling-rings 21, the detailed construction of which has been illustrated in Figs. 3 and 4 of the drawings, by reference to which it will be understood that said rings, which are of an interior diameter corresponding with the interior diameter of the pipes, are of an extreme exterior diameter exceeding the exterior diameter of the pipes and practically equal to that of the enlarged inner ends of the openings 13. In order, however, to permit of the insertion of the said coupling-rings through the openings or bores 14, the said rings are reduced on diametrically opposite sides, as shown at 22, the reduced portions being rounded or beveled, as shown at 23. Said coupling-rings are also provided with undercut notches 24 and with overhanging lugs 25 corresponding with and adapted to engage the lugs 3 and the notches 2 of the pipe ends. When thus engaged, the coupling-rings seated upon the shoulders 20 of the inner ends of the bores 14 will positively prevent the displacement in an outward direction of the pipes when the latter are mounted and the bolts 19 are tightened as shown in Fig. 1 of the drawings.

It is obvious that the principles of my invention are capable of being applied to L's or to four-way couplings in precisely the same manner as they have been herein shown as applied to T-couplings, there being no change whatever in the means required for connecting the pipe with the coupling.

I have in the foregoing described a simple and preferred form of construction of my invention; but I desire it to be understood that I do not limit myself to the structural details herein shown and described, but reserve the right to any changes and modifications which may be resorted to without departing from the spirit and scope of my invention and without detracting from the utility of the same.

Having thus described my invention, I claim—

A pipe-coupling comprising tubular members, said members being provided at their adjacent ends with undercut notches and overhanging lugs, said lugs and notches of the tubular members being interlocked to prevent longitudinal displacement, and one of said tubular members being of an extreme diameter exceeding that of the other, a coupling-sleeve having a bore enlarged at its inner end to form a seat for the large tubular interlocking member, a coupling-plate fitted upon the tubular interlocking members, of less diameter and having a flange exteriorly engaging the sleeve, a compressible gasket seated within said flange and engaging the end of the sleeve, and connecting means.

In testimony that I claim the foregoing as my own I have hereto affixed my signature in the presence of two witnesses.

JULIEN EUGENE TINKER.

Witnesses:
ARCHIE D. COHN,
EDW. F. MCINTYRE.